United States Patent

[11] 3,632,368

| [72] | Inventor | Robert D. Nelson<br>Sunnyvale, Calif. |
|---|---|---|
| [21] | Appl. No. | 89,046 |
| [22] | Filed | Nov. 12, 1970 |
| [45] | Patented | Jan. 4, 1972 |
| [73] | Assignee | Lubrication Sciences, Inc.<br>Mountain View, Calif.<br>Continuation-in-part of application Ser. No. 777,161, Nov. 16, 1968, now abandoned, which is a continuation-in-part of application Ser. No. 504,063, Oct. 23, 1965, now abandoned, and a continuation-in-part of 657,784, Aug. 2, 1967, now abandoned. This application Nov. 12, 1970, Ser. No. 89,046 |

[54] LUBRICANT COATED BEARING AND METHOD
7 Claims, No Drawings

[52] U.S. Cl....................................................... 117/16,
117/22, 117/31, 252/25

[51] Int. Cl......................................................... B44d 1/094
[50] Field of Search............................................ 117/16, 22,
31; 252/12, 25

[56]   References Cited
UNITED STATES PATENTS

| 2,622,993 | 12/1952 | McCullough et al. ........ | 252/25 |
|---|---|---|---|
| 3,100,724 | 8/1963 | Rocheville.................... | 117/31 |

*Primary Examiner*—William D. Martin
*Assistant Examiner*—Raymond M. Speer
*Attorney*—Luedeka, Fitch, Even & Tabin

ABSTRACT: Method of providing a dry lubricant coating on a bearing surface by cleaning the surface to remove contaminants, maintaining the surface in an essentially atomically clean condition and impinging discrete particles of a layer lattice structured dry lubricant against the clean bearing surface with sufficient energy to cause the particles to become diffusion bonded to the bearing surface.

LUBRICANT COATED BEARING AND METHOD

This application is a continuation-in-part of copending application Ser. No. 777,161, filed Nov. 16, 1968, and now abandoned, which is in turn a continuation-in-part of copending application Ser. No. 504,063, filed Oct. 23, 1965 and copending application Ser. No. 657,784, filed Aug. 2, 1967, both of which are now abandoned.

This invention relates generally to a method for providing a dry lubricant coating on a bearing surface, and more particularly it relates to an improved method for providing an integral, adherent, dry lubricant coating on a bearing surface in the absence of solvents, special atmosphere or binders, and posttreatment of the coated bearing surface, and to such a coated bearing surface.

The use of dry lubricant materials to reduce friction and wear is known, examples of these materials being graphite and molybdenum disulfide. In recent years the increasing technology in the areas of high vacuum and cryogenics, and the advent of space travel, has increased interest in dry lubricants since these materials are nonvolatile and are able to withstand high vacuum and low temperatures without loss of lubricating properties. Graphite, the most common dry lubricant, is not desirable in many high vacuum and/or low-temperature applications due to its loss of lubricating properties in the absence of moisture. Likewise, liquid lubricants, such as oils and greases, have limited usefulness in many applications, particularly in vacuum and in static or intermittent operations where the bearing surface is not constantly in motion and therefore is not always coated with the liquid lubricating film.

The term "dry lubricant," as used herein, is intended to include those materials known generally as "layer lattice structured materials." Layer lattice structured materials are generally recognized in the dry lubricant art as materials in which the crystalline lattice structure of the materials is a platelet form in which the metal atoms are centrally located within the platelet and the nonmetallic atoms are arranged on each side thereof. Examples of layer lattice structured materials which are useful as dry lubricants include a number of chalcogenides and dichalcogenides of the group $Vb$ and $VIb$ metals, i.e., niobium, molybdenum and tungsten. The disulfides, ditellurides and diselinides of these metals are generally most commonly employed as dry lubricants. Boron nitride is also an acceptable dry lubricant material and for purposes of this invention the term layer lattice structured materials include boron nitride.

It has been known to provide a dry lubricant coating on a bearing surface through ball milling and through the use of volatile solvents and binder systems followed by baking or other posttreatment. Such processes are generally undesirable for the reasons that the lubricant coating is either not sufficiently adherent to the bearing surface or has a significant thickness and interferes with the tolerances of the bearing surface. Ball milling, in addition to failing to provide adherent dry lubricant coatings, also is limited to coating of very small pieces. Ideally, the bearing surface should be coated with the dry lubricant coating to a thickness such that the dry lubricant coating does not interfere with the tolerances of the bearing surface. This is particularly true where the bearing surface interfits or cooperates with another machine surface.

It is an object of the present invention to provide a method for coating a bearing surface with an integral adherent continuous dry lubricant coating.

Another object is to provide a bearing surface with an integral adherent continuous dry lubricant coating in the absence of vehicles, solvents or binders for the dry lubricant and without requiring posttreatment of the coated bearing surface.

A further object is to provide a method for coating a bearing surface with a dry lubricant material which is specifically adapted to provide an adherent dry lubricant coating on the bearing surface.

These and other objects of the invention will be readily understood from the following detailed description.

Generally, the invention is directed to a method of coating a bearing surface that is subject to frictional wear with an integral, adherent, substantially continuous coating of a layer lattice structured dry lubricant material which includes cleaning the bearing surface to provide an essentially atomically clean surface, maintaining the atomically clean nature of the bearing surface between the time of cleaning and the application of the dry lubricant coating, and coating the essentially atomically clean bearing surface by impinging a stream of discrete particles of a layer lattice structured material against the essentially atomically clean bearing surface with sufficient energy to cause the particles to plastically deform and become diffusion bonded to the essentially atomically clean surface. The layer lattice structured dry lubricant material is most preferably impinged against the bearing surface in the absence of all vehicles, solvents and binders. The invention is also directed to an article having improved antifriction properties which includes a bearing surface to which is diffusion bonded an integral, adherent, continuous layer lattice structured dry lubricant coating, the bearing surface being essentially atomically clean at the instant of application of the layer lattice structured dry lubricant coating.

The term "essentially atomically clean," as used herein, is defined as the removal of substantially all vestiges of contaminants from the surface to be coated so that the surface to which the layer lattice structured dry lubricant material is applied consists essentially of the exposed molecular structure of the surface. A bearing surface which is essentially atomically clean is a surface from which all gross contaminants such as oil, grease, moisture, etc., have been removed and, in addition, from which all chemical contaminants, such as oxide scale and other chemical reaction products have also been removed. It is of particular importance that the bearing surface be essentially free from oxide scale at the instant the layer lattice structured dry lubricant material is applied to the bearing surface. The formation of oxide scale which occurs on most metals upon exposure to the ambient atmosphere for a period of several hours has been found to interfere with the diffusion bond of the layer lattice structured dry lubricant coating to the bearing surface, and is to be avoided.

The bearing surface may be cleaned in any convenient manner which is sufficient to provide an essentially atomically clean surface. In this connection, the cleaning may include the use of solvents, chemical agents, ultrasonic treatment, or abrading, or any other form of cleaning which is sufficient to provide an essentially atomically clean bearing surface. For most applications it has been found that abrading by means of a mild abrasive or scouring agent, is desirable. The scouring agent should have sharp cutting surfaces and may be finely powdered silica, sometimes known as lab flour, pumice, aluminum oxide, or other fine scouring agent. The cleaning is conveniently carried out by suspending the scouring agent in an air stream and impinging the abrasive particles against the bearing surface. This cleaning may be performed in a manner similar to sandblasting and may include the use of conventional type jet impingement sandblasting apparatus. However, the scouring action should only be sufficient to remove all oxide and related contaminants and should not erode or cut away measurable quantities of bearing surface. The use of fine silica powder of 400–800 mesh has been found to provide good results. This is particularly important where close tolerances are required in the dimensions of the bearing surface.

Good results have been obtained through the use of an initial solvent degreasing operation to remove soluble gross contaminants followed by scouring the bearing surface with a finely ground silica powder sold under the trade name Optical Flour, and having an average particle size of 400–800 mesh in a sandblasting apparatus at nozzle pressures within the range of 100 p.s.i.g. to 120 p.s.i.g. The cleaning of the bearing surface with a scouring powder is not essential so long as an equivalent cleaning step is carried out which is sufficient to remove essentially all vestiges of contaminants from the bearing surface and to provide an essentially atomically clean surface which is uniformly, slightly etched or cratered.

As indicated, it is necessary to maintain the bearing surface in an essentially atomically clean condition from the time of cleaning up to and including the instant of application of the layer lattice structured dry lubricant coating material. Unless the bearing surface is in an essentially atomically clean condition at the instant the layer lattice structured dry lubricant material is impinged against the bearing surface, the diffusion bonding of the dry lubricant coating to the bearing surface will not be as complete as is desirable for many applications.

For most bearing materials, and particularly iron and steel of commerce, including stainless steel and specialty steel alloys, it has been determined that the bearing surface, after cleaning as described herein, remains in an essentially atomically clean condition as defined herein, for short periods of time without becoming recontaminated to an extent which interferes with the diffusion bonding of the layer lattice structured dry lubricant coating to the bearing surface. Accordingly, the bearing surface can be exposed to the ambient atmosphere for short periods. For example, steel alloy bearing surfaces which have been scoured to remove all oxide contaminants and to provide an essentially atomically clean bearing surface may be exposed to ambient conditions for periods of time up to about 4 hours without a significant degree of recontamination which would destroy the essentially atomically clean nature of the bearing surface. If, however, the ambient surroundings contain significant amounts of corrosive materials, moisture, and/or dirt, dust, soot, and the like, the essentially atomically clean nature of the bearing surface will be more rapidly deteriorated and the bonding of the layer lattice structured dry lubricant coating to the bearing surface will be diminished.

For best results the layer lattice structured dry lubricant coating should be applied to the essentially atomically clean bearing surface immediately after cleaning, or a protective coating, as described hereinafter, should be applied to the essentially atomically clean bearing surface to protect the bearing surface between the time of cleaning and the time of application of the layer lattice structured dry lubricant coating.

The layer lattice structured dry lubricant coating is applied to the essentially atomically clean bearing surface by impinging particles of the layer lattice structured dry lubricant against the essentially atomically clean bearing surface with sufficient energy that the layer lattice structured dry lubricant material is plastically deformed and is diffusion bonded to the essentially atomically clean bearing surface. Diffusion bonding, as used herein, is defined as diffusion of interfacial atoms of the layer lattice structured material across the interface between the layer lattice structured material and the bearing surface. Solid state bonding by interatomic attraction across the interface between the layer lattice structured material and the bearing surface may also occur to some extent. The exact mechanism by which the bond occurs is not altogether understood, and the explanation herein is not intended to be limiting upon the invention. It is believed, however, that some form of diffusion or solid state bond is created when the particles of layer lattice structured material are impinged against the bearing surface. Further, it is believed that this bond is created without melting of the particles since the energy released upon impact does not appear to be sufficient to cause the particles of layer lattice structured material to melt or become molten. However, it does appear that the molecules of the lubricant are reoriented upon impact.

The discrete particles of the layer lattice structured dry lubricant material must be impinged against the essentially atomically clean bearing surface with sufficient energy to cause the particles to become plastically deformed and to bring the molecules of the layer lattice structured material within atomic distances of the molecules of the bearing surface. A convenient manner of impinging the particles of the layer lattice structured dry lubricant material against the essentially atomically clean bearing surface is by suspending the layer lattice structured material particles in a gas stream and directing the gas stream containing these suspended particles against the bearing surface by jet impingement. Apparatus similar to sandblasting equipment may be conveniently employed. Generally, when a nozzle having a diameter of about three-sixteenths inch is employed, nozzle pressures between about 80 p.s.i.g. and about 150 p.s.i.g. preferably about 100 p.s.i.g. and 120 p.s.i.g. may conveniently be employed. With other nozzle sizes and configuration or different particle mass slightly differing pressures may be employed to obtain the desired energy.

It is believed to be necessary to apply the layer lattice structured dry lubricant coating by means of impingement of discrete particles thereof against a bearing surface which is essentially atomically clean at the instant of impingement in order to obtain a sufficiently strong diffusion bond between the layer lattice structured dry lubricant particles and the bearing surface. Means of applying the lubricant material which do not include impingement of discrete particles do not provide sufficient energies to establish diffusion bonding. In addition, a strong diffusion bond is not obtained if the dry lubricant material is suspended in a vehicle or contains a solvent, or if the particles are admixed with a binder, and the use of these type materials is to be avoided. In order to obtain a reproducible strong diffusion bond of the layer lattice structured dry lubricant material to the bearing surface, the particles of the layer lattice structured dry lubricant material should be impinged against the bearing surface in the absence of all solvents, vehicles or binders.

The layer lattice structured dry lubricant particles have platelet crystal structure and are rectangular or ellipsoidal in shape, and generally have a short axis of between about 3 and about 4 microinches. Generally, the size of the layer lattice structured dry lubricant particles is not critical in obtaining a strong diffusion bond to the bearing surface, except that large variations in sizes of the particles may require adjustment of the nozzle pressure in a gas spraying device such as a sandblasting booth in order to accelerate the particles to sufficient velocity to obtain desired impact energies. For most purposes, and with most available layer lattice structured dry lubricants, average particle sizes of between less than about one-half micron "fines" and about 10 microns provide good results using nozzle pressures of between about 90 and about 125 p.s.i.g.

The particle size of the layer lattice structured dry lubricant coating material does not significantly affect the thickness of the lubricant coating that becomes bonded to the bearing surface. The layer lattice structured dry lubricant material does not diffusion bond to itself during the coating operation, and the coating which becomes bonded to the bearing surface is essentially one platlet thick or one particle thick, e.g., 3 to 4 microinches. Accordingly, the use of larger size particles may result in a somewhat thicker coating than the coating that is obtained from the use of smaller sizes. For the most purposes, variations in the thickness of the lubricant coating are not of major importance using layer lattice structured dry lubricant particles generally available in commerce.

Layer lattice structured materials which are useful as dry lubricants in the described process are known. The most commonly used materials are molybdenum disulfide and tungsten disulfide. Other layer lattice structured materials which are useful within the scope of the invention include the disulfides, ditellurides and diselinides of molybdenum, niobium and tungsten, and also boron nitride.

As previously indicated, the bearing surface should be essentially atomically clean at the instant of impingement of the layer lattice structured lubricant particles in order to obtain a strong diffusion bond. In addition, the layer lattice structured dry lubricant material should be in a pure state, and free from contaminants so that diffusion bonding will readily occur. When the layer lattice structured dry lubricant is a disulfide, it is generally desirable to insure that excessive amounts of free sulfur are not present. One method of obtaining this result is by heating the particles to an elevated temperature, e.g., 100° to 200° C. with purging of hydrogen. Any other similar or equivalent method of insuring the purity and the absence of contaminants in the layer lattice structured dry lubricant material may conveniently be employed.

The layer lattice structured dry lubricant particles may be impinged against the bearing surface, using conventional sandblasting equipment. Generally a booth or similar apparatus, well known in the sandblasting art, is sufficient. Dry compressed air is supplied at the desired pressure, e.g., 80 to 150 p.s.i.g., and the particulate layer lattice structured dry lubricant material is entrained in the air stream from a suitable hopper, which may be fluidized by vibration or low-pressure air. A syphon ejector type of entrainment device may be utilized and a conventional trigger-operated operated on/off valve is generally used. In both the described scouring and cleaning operation and in the application of the lubricant coating, the nozzle of a vapor blasting device is moved to and fro to direct the stream of air and entrained particles across the bearing surface. Generally, a distance from one-half to 2 inches or more from the nozzle to the bearing surface and impingement of the particles normal or substantially normal to the bearing surface provides desired cleaning and coating.

It has been previously emphasized that in order to obtain an adherent diffusion bonded layer lattice structured dry lubricant coating on the bearing surface it is necessary that the bearing surface be essentially atomically clean at the instant of impingement of the lubricant particles. It has been further indicated that although some delay between cleaning and coating is permissible, that inordinate delays or the presence of corrosive or generally dirty atmosphere will cause sufficient recontamination of the bearing surface such that an adherent diffusion bond will not be created. In such instances it has been found that it is desirable to provide a protective coating on the bearing surface between the time that the surface is cleaned and the time the lubricant coating is applied. In order to accomplish this result, the bearing surface is desirably sprayed using the aforementioned sandblasting technique with a mixture of materials which provides the desired cleaning of the bearing surface, and simultaneously coats the bearing surface with a protective film, thereby preventing recontamination of the bearing surface prior to application of the lubricant coating. Further, the protective film which is formed on the bearing surface is of a nature that it is completely dissipated or is sublimated during application of the layer lattice structured dry lubricant coating, and a separate step of removing the protective coating, prior to application of the lubricant coating is unnecessary.

For purposes of description, the step in the process which includes the combination of cleaning and application of a protective coating is herein termed a precoat operation, and in this connection, this term is intended to mean the application by impingement spraying against the bearing surface, of a precoat composition which includes a scouring agent, as described above, and a film-forming compound which forms a protective film on the bearing surface. In addition, the precoat formulation preferably, but not necessarily, includes a thermally unstable compound which is retained in the protective coating and which is decomposed upon impingement of the layer lattice structured dry lubricant coating material against the bearing surface to yield gaseous hydrogen.

As indicated, the precoating composition may include any of the scouring agents described herein. The film-forming protective material may be any particulate material which is inert with respect to the scouring agent and the thermally unstable compound and which forms a substantially continuous protective coating on the bearing surface upon impingement. Fatty acids such as stearic acid may be successfully utilized, although other fatty acids or mixtures of fatty acids which are solid film-forming materials at room temperature may also be employed.

As indicated, the precoat mixture may consist solely of the scouring agent and the fatty acid protective coating agent. However, when a precoat composition is employed in the method in order to maintain the essentially atomically clean nature of the bearing surface, it is usually always desirable to include in the precoating composition a thermally unstable material which yields hydrogen upon impingement of the layer lattice structured dry lubricant particles. Such is particularly true when the coating operation is carried out under adverse conditions. The hydrogen yielding compounds should be stable at room temperature but should readily decompose when heated to slightly elevated temperatures, such as are encountered upon impingement of the lubricant particles. Alkali and alkaline earth metal hydrides, for example, cesium or calcium hydride can be used with success. Other compounds which decompose to yield gaseous hydrogen under the conditions of impingement of the dry lubricant particles, e.g., lithium aluminum hydride, may also be employed.

When the precoating composition includes a hydrogen-yielding material, e.g., calcium hydride, the use of a fatty acid to form the protective coating is desirable in order to prevent undesired decomposition of the cesium hydride. When the fatty acid, scouring agent and calcium hydride are combined to form the precoat mixture, the fatty acid forms a coating on the surface of the calcium hydride particles, thus preventing deterioration of the cesium hydride through absorption of moisture. The fatty acid also provides a dampening of the impact energy when the precoat composition is impinged against the bearing surface and insures that the hydride is not prematurely decomposed.

The precoat composition is prepared by first mechanically mixing together the particulate calcium hydride and fatty acid, e.g., stearic acid. The stearic acid forms a coating on the surface of the calcium hydride particles, thus protecting the calcium hydride from reaction with ambient moisture. The amount of stearic acid mixed with the calcium hydride is preferably adjusted so that there is a minimum of free stearic acid particles present. The stearic acid coated calcium hydride particles are then mechanically mixed with the scouring agent, e.g., silica flour. Because there is little free stearic acid particles present, the silica flour particles do not become coated with stearic acid.

The calcium hydride and stearic acid may be mixed together in a ratio of between about 1:0.5 and about 1:2.5, preferably 1:1, parts by volume of calcium hydride to stearic acid to provide desired coating of the calcium hydride by the stearic acid. This mixture is then admixed with from about 8 to 20, preferably 10 to 15 parts, by volume of silica flour to form the precoat composition. A preferred precoat composition contains, by volume, 6.5 percent calcium hydride, 6.5 percent stearic acid, and 87 percent silica flour.

In some circumstances, such as where the method of the present invention is carried out under ambient conditions of high relative humidity, it may be desirable to include an anticaking agent in the precoat powder. Various anticaking agents are suitable, including finely divided silicon dioxide. Such anticaking agents may be utilized at levels up to about 20 percent by volume of the precoat powder.

The precoat powder is impinged against the bearing surface in the same manner as previously described. The silica flour particles provide the desired cleaning effect, removing unwanted contaminants and creating an essentially atomically clean bearing surface. Simultaneously the stearic acid coated calcium hydride particles are impinged against the bearing surface and become adhered thereto in the form of a thin protective film or coating. The hard silica flour particles rebound after striking the bearing surface and do not, to any significant extent, become entrapped in the protective coating.

The protective coating builds up to a thickness of about 1 ml. and adequate coverage of the bearing surface may be gauged by the appearance of a uniform protective "bloom" on the bearing surface. Excess precoat powder issued from the spraying apparatus, which includes substantially all of the silica flour and the stearic acid coated calcium hydride powder which did not adhere to the bearing surface can be collected in a suitable hopper for reuse.

The bearing surface coated with the protective film is then ready for application of the layer lattice structured dry lubricant coating. Since the bearing surface has a protective coating, the lubricant coating need not be immediately applied, although care should be taken to protect the bearing surface from abrasion or contact with materials which would remove the protective coating and expose the essentially atomically clean bearing surface to recontamination. The protective coating is not removed by ordinary handling, and the protective coating is sufficiently strong and adherent so as to be able to survive the standard adhesive tape test.

The layer lattice structured dry lubricant coating is applied to the bearing surface provided with the protective film in the same manner as described herein in connection with the coating of bearing surfaces which do not have a protective coating. The impact of the layer lattice structured material against the protective calcium hydride-stearic acid film generates sufficient heat to raise the temperature of the calcium hydride above its decomposition temperature, yielding gaseous hydrogen which forms a protective reducing atmosphere adjacent the bearing surface. The reducing hydrogen atmosphere prevents recontamination of the bearing surface and also reduces any contaminants which might still be present at the bearing surface.

The impact of the layer lattice structured material also causes the stearic acid to be removed from the bearing surface by sublimation and by impact, thereby exposing the essentially atomically clean bearing surface which is substantially immediately coated with the layer lattice structured material in the described manner.

It has further been found that in accordance with a preferred embodiment of the present invention, optimum adherence of the layer lattice structured material to the bearing surface at the desired thickness is obtained when the particle size of the scouring agent of the precoating composition has a particular relationship to the particle size of the layer lattice structured material. Preferably, the particle sizes of these two materials do not differ greatly, and preferably the particle size of the scouring agent is of the same order of magnitude as the particle size of the layer lattice structured material. Moreover, contrary to what would be expected, the use of a scouring agent having a particle size substantially less than the particle size of the layer lattice structured material does not result in improved adherence of a desirably thick layer of the layer lattice structured material.

Accordingly, it is preferred that the particle size of the scouring agent should be approximately the same size as the particle size of the layer lattice structured material for optimum results. It should be understood, however, satisfactory adherence of a desirably thick layer of the layer lattice structured material is achieved when other particle sizes are used.

The described method is useful in providing improved dry lubricant coatings of diverse bearing surfaces, including ball bearings and races, pistons, cylinders, clock movements, shafts and many other types of bearing surfaces subject to frictional wear. Bearing surfaces provided with a diffusion bonded dry lubricant coating applied to the bearing surface when the bearing surface is essentially atomically clean have superior long life without wear, galling or other forms of frictional failure. The application of the dry lubricant coating through the use of jet impingement sandblasting apparatus lends itself to many different types of production processing which can be automated, or manual, as may be desired.

Although various features of the invention have been set forth with particularity in order to provide a complete description, alternate embodiments and features, within the skill of the art are also contemplated.

What is claimed is:

1. A method of coating an article having a metal bearing surface subject to frictional wear with an integral, adherent substantially continuous coating of a layer lattice structured dry lubricant material comprising cleaning the surface to be coated to remove essentially all contaminants therefrom and to provide a surface which is essentially atomically clean by impinging on the surface a mixture of an abrasive scouring agent and a particulate composition comprising a solid film-forming fatty acid to provide an atomically clean surface with a protective fatty acid coating thereon, thereby maintaining the surface in an essentially atomically clean condition, and prior to any significant recontamination of the essentially atomically clean surface, and in the absence of any binder or solvent, impinging discrete particles of layer lattice structured dry lubricant material against the essentially atomically clean and coated surface with sufficient energy to cause the lubricant particles to plastically deform and become diffusion bonded to the bearing surface, and continuing such impingement until a substantially continuous lubricant coating is obtained on the bearing surface, the fatty acid protective coating being dissipated during application of the layer lattice structured dry lubricant coating.

2. A method in accordance with claim 1 wherein the particles of layer lattice structured dry lubricant material are entrained in a compressed gaseous stream and impinged at a nozzle pressure of between about 80 and about 150 p.s.i.g.

3. A method in accordance with claim 1 wherein the mixture further comprises an alkali or alkaline earth metal hydride which is decomposable at elevated temperatures to yield gaseous hydrogen.

4. A method in accordance with claim 1 wherein the layer lattice structured material is selected from the disulfides, ditellurides and disellenides of molybdenum, tungsten, and niobium, and boron nitride.

5. A method in accordance with claim 3 wherein the mixture comprises a mixture of a particulate abrasive scouring agent and particulate calcium or cesium hydride, the hydride particles being coated with stearic acid.

6. A method in accordance with claim 3 wherein the mixture comprises between about 8 and about 20 parts by volume abrasive scouring agent, and between about 1.5 and 3.5 parts by volume of hydride coated with stearic acid.

7. A method of coating an article having a metal bearing surface subject to frictional wear with an integral, adherent substantially continuous coating of a layer lattice structured dry lubricant material comprising, cleaning the surface to be coated to remove essentially all contaminants therefrom and to provide a surface which is essentially atomically clean, maintaining the surface to be coated in an essentially atomically clean condition, and prior to any significant recontamination of the essentially atomically clean surface, and in the absence of any binder or solvent, impinging discrete particles of layer lattice structured dry lubricant material against the essentially atomically clean surface with sufficient energy to cause the particles to plastically deform and become diffusion bonded to the bearing surface, and continuing such impingement until a substantially continuous lubricant coating is obtained on the bearing surface, said cleaning step being effected by impinging against the bearing surface a particulate composition comprising an abrasive scouring agent having a particle size of the same order of magnitude as the particle size of the dry lubricant material.

* * * * *